(12) United States Patent
Gu et al.

(10) Patent No.: US 12,287,130 B2
(45) Date of Patent: Apr. 29, 2025

(54) HEAT EXCHANGE SYSTEM, AIR CONDITIONING APPARATUS AND CONTROL METHOD FOR AIR CONDITIONING APPARATUS

(71) Applicant: CHONGQING MIDEA GENERAL REFRIGERATION EQUIPMENT CO., LTD., Chongqing (CN)

(72) Inventors: Yantao Gu, Chongqing (CN); Kaisheng Liu, Chongqing (CN); Bin Dai, Chongqing (CN)

(73) Assignee: CHONGQING MIDEA GENERAL REFRIGERATION EQUIPMENT CO., LTD., Chongqing (CN)

( * ) Notice: Subject to any disclaimer, the term of this patent is extended or adjusted under 35 U.S.C. 154(b) by 388 days.

(21) Appl. No.: 17/917,926

(22) PCT Filed: Dec. 23, 2020

(86) PCT No.: PCT/CN2020/138496
§ 371 (c)(1),
(2) Date: Oct. 8, 2022

(87) PCT Pub. No.: WO2021/258689
PCT Pub. Date: Dec. 30, 2021

(65) Prior Publication Data
US 2023/0152014 A1     May 18, 2023

(30) Foreign Application Priority Data

Jun. 23, 2020 (CN) .......................... 202010577788.8
Jun. 23, 2020 (CN) .......................... 202010577789.2

(51) Int. Cl.
*F25B 41/20* (2021.01)
*F25B 13/00* (2006.01)

(52) U.S. Cl.
CPC .............. *F25B 41/20* (2021.01); *F25B 13/00* (2013.01); *F25B 2313/02742* (2013.01); *F25B 2700/04* (2013.01)

(58) Field of Classification Search
CPC .. F25B 13/00; F25B 2700/04; F25B 2500/23; F25B 2500/24; F25B 2600/05
See application file for complete search history.

(56) References Cited

U.S. PATENT DOCUMENTS 6,834,510 B1    12/2004  Pfister et al.
2009/0049857 A1  2/2009  Murakami et al.
(Continued)

FOREIGN PATENT DOCUMENTS

CN    201293492 Y    8/2009
CN    102878650 A    1/2013
(Continued)

OTHER PUBLICATIONS

International Search Report mailed Mar. 31, 2021 of PCT/CN2020/138496.
(Continued)

*Primary Examiner* — Lionel Nouketcha (57) ABSTRACT

The present disclosure provides a heat exchange system, air conditioning apparatus and control method for air conditioning apparatus. The heat exchange system including a compressor; a four-way valve; a first heat exchanger; a throttle device; a second heat exchanger; a fluid reservoir, including a first communication port and a second communication port, and the first communication port is communicated with the suction port, and the second communication port is communicated with one end of the second heat exchanger; a first valve body, being arranged on a flow path between the fluid reservoir and the compressor; a second valve body, being arranged on a flow path between the second communication port of the fluid reservoir and the (Continued)

throttle device; and a detection device, being used to detect the refrigerant amount for heat exchange cycle in the heat exchange system.

15 Claims, 4 Drawing Sheets

(56) References Cited

U.S. PATENT DOCUMENTS

| | | | | |
|---|---|---|---|---|
| 2010/0199697 | A1* | 8/2010 | Sakashita | B08B 9/035 62/426 |
| 2014/0174114 | A1* | 6/2014 | Tamaki | F25B 45/00 62/129 |
| 2016/0123645 | A1* | 5/2016 | Kim | F25B 13/00 62/115 |

FOREIGN PATENT DOCUMENTS

| | | | |
|---|---|---|---|
| CN | 203100306 U | * | 7/2013 |
| CN | 206291547 U | | 6/2017 |
| CN | 110529966 A | | 12/2019 |
| CN | 111692772 A | | 9/2020 |
| CN | 111692773 A | | 9/2020 |
| EP | 1106940 A2 | | 6/2001 |
| FR | 2836421 B1 | | 11/2009 |

OTHER PUBLICATIONS

Decision of Reexamination received in CN App No. 202010577789.2; mailed Oct. 26, 2023.

EESR received in EP Application No. 20941635.3; mailed Oct. 4, 2023.

First OA received in Indian Application No. 202247052228; mailed Jan. 25, 2023.

First OA received in CN Application No. 202010577788.8; mailed Feb. 4, 2021.

First Search Report received in CN Application No. 202010577788.8; mailed Jan. 25, 2021.

Second OA received in CN Application No. 202010577788.8; mailed Jun. 8, 2021.

Rejection decision received in CN Application No. 202010577788.8; malled Dec. 31, 2021.

"Yupeng wheel power plant and management", chief editors: Zhang Cunyou; Du Taili, published by Dalian Maritime University Press.

First OA received in CN Application No. 202010577789.2; mailed Feb. 4, 2021.

First Search Report received in CN Application No. 202010577789.2; mailed Jan. 26, 2021.

Second OA received in CN Application No. 202010577789.2; mailed Jun. 8, 2021.

Rejection decision received in ON Application No. 202010577789.2; mailed Dec. 31, 2021.

Notification of Reexamination received in CN Application No. 202010577789.2; mailed Aug. 25, 2023.

Supplementary Search Report received in CN Application No. 202010577789.2; mailed Sep. 28, 2021.

"A Practical Manual of Energy Conservation in Green Hospitals".

"Safe operation, maintenance management and energy conservation and environmental protection of refrigeration and air conditioning systems".

"Ship Auxiliary Engine".

"The Meaning of the Fault Code of the New Green Air Conditioner Quick Repair Skills One Point".

* cited by examiner

Prior Art

HEAT EXCHANGE SYSTEM, AIR CONDITIONING APPARATUS AND CONTROL METHOD FOR AIR CONDITIONING APPARATUS

CROSS-REFERENCES TO RELATED APPLICATIONS

The present disclosure is a national phase application of International Application No. PCT/CN2020/138496, filed on Dec. 23, 2020, which claims priority to Chinese Patent Application No. 202010577788.8 and No. 202010577789.2 filed with China National Intellectual Property Administration on Jun. 23, 2020, the entireties of which are herein incorporated by reference.

FIELD

The present disclosure relates to the field of air conditioning, in particular, to heat exchange system, air conditioning apparatus and control method for air conditioning apparatus.

BACKGROUND

In the air-cooled heat pump unit, the refrigeration cycle and the heating cycle are inconsistent due to the inconsistent demand of the system for the amount of refrigerant, and the excess refrigerant needs to be stored in the accumulator for heating. This part of the refrigerant does not participate in the system circulation, preventing too much refrigerant from entering the system circulation and causing high pressure to rise, power to increase, and energy efficiency to decrease.

Figure 1:
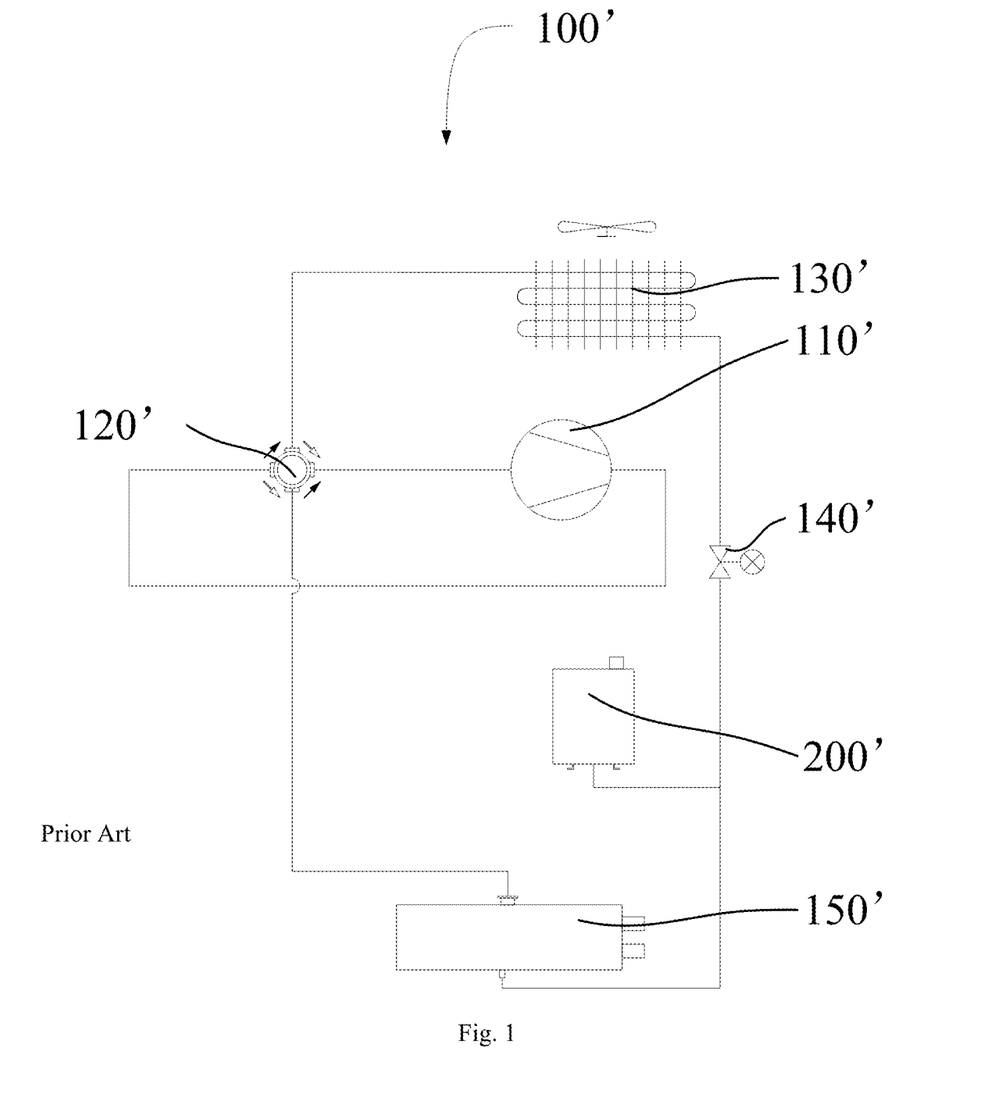
FIG. 1 shows a schematic structural diagram of a heat pump unit in the related art.

FIG. 1 is a diagram of a commonly used heat pump unit 100', omitting irrelevant gas-liquid separators and oil separators.

When the unit is operating for cooling, the circulation process is compressor 110'→four-way valve 120'→fin type heat exchanger 130'→electronic expansion valve 140'→shell tube type heat exchanger 150'→four-way valve 120'→compressor 110'. When the unit is operating for heating, the circulation process is compressor 110'→four-way valve 120'→shell tube type heat exchanger 150'→electronic expansion valve 140'→fin type heat exchanger 130'→four-way valve 120'→compressor 110'.

For example, during the heating cycle, the connection between the accumulator 200' and the shell tube is before the electronic expansion valve 140' is throttled. Here is under high pressure, the pressure is higher than the internal pressure of the accumulator 200', and the refrigerant will fill the accumulator 200'. During the refrigeration cycle, the connection between the accumulator 200' and the shell tube is after the electronic expansion valve 140' is throttled. Here is under the low pressure, the pressure is lower than the accumulator 200', the refrigerant will automatically flow out from the accumulator 200' and enter the system circulation.

However, when the heat pump unit 100' is in the heating cycle, the accumulator 200' is completely filled with refrigerant. After the capacity of the accumulator 200' is determined, the amount of refrigerant stored is further fixed. Then, during the heating operation, the amount of refrigerant entering the system circulation is further determined, which cannot be adjusted according to the difference of the working conditions. It may lead to heavy load conditions, large refrigerant demand, insufficient liquid supply to the system, and reduced energy efficiency. For light load conditions, the demand for refrigerant is relatively small, resulting in increased power and reduced energy efficiency.

SUMMARY

The present disclosure aims to improve at least one of the problems existing in the prior art.

Embodiment of the present disclosure provides a heat exchange system.

Embodiment of the present disclosure provides an air conditioning apparatus.

Embodiment of the present disclosure provides a control method for air conditioning apparatus.

In view of this, according to an embodiment of the present disclosure, the present disclosure provides a heat exchange system, including a compressor, including an exhaust port and a suction port; a four-way valve, and a first end port of the four-way valve is communicated with the suction port, and a second end port of the four-way valve is communicated with the exhaust port; a first heat exchanger, and one end of the first heat exchanger is communicated with a third end port of the four-way valve; a throttle device, and one end of the throttle device is communicated with another end of the first heat exchanger; a second heat exchanger, and one end of the second heat exchanger is communicated with another end of the throttle device, and another end of the second heat exchanger is communicated with a fourth end port of the four-way valve; a fluid reservoir, including a first communication port and a second communication port, and the first communication port is communicated with the suction port, and the second communication port is communicated with one end of the second heat exchanger; a first valve body, being arranged on a flow path between the fluid reservoir and the compressor; a second valve body, being arranged on a flow path between the second communication port of the fluid reservoir and the throttle device; and a detection device, being used to detect the refrigerant amount for heat exchange cycle in the heat exchange system, and, when the heat exchange system operates in a heating condition, working states of the first valve body and the second valve body are controlled according to the refrigerant amount in the heat exchange system.

The heat exchange system provided by the present disclosure includes a refrigerant circuit consisting of a compressor, a four-way valve, a first heat exchanger, a throttle device, and a second heat exchanger. In addition, it further includes a fluid reservoir, a first valve body, and a second valve body. The fluid reservoir includes a first communication port and a second communication port, and one end of the first valve body is communicated to the first communication port, and another end of the first valve body is communicated to the suction port of the compressor. One end of the second valve body is communicated with the second communication port, and another end of the second valve body is communicated with the second heat exchanger. It further includes a detection device, which is used to detect the refrigerant amount for heat exchange cycle in the heat exchange system, that is, the refrigerant in the fluid reservoir does not enter the circuit to circulate and exchange heat, and this part of the refrigerant amount is not within the detection range of the detection device. Furthermore, when the heat exchange system operates under the heating condition, the working states of the first valve body and the second valve body are controlled according to the refrigerant amount for heat exchange system. Furthermore, it is possible to flexibly control the refrigerant amount of refrigerant in the fluid reservoir entering the heat exchange cycle, that is, the refrigerant amount for heat exchange cycle in the heat exchange system can be increased or decreased according to the actual situation, and to reduce the power of the heat exchange system and increase the energy efficiency of the heat exchange system.

For example, the heat exchange system can realize the cooling or heating of the heat exchange system by adjusting the communication state of the four-way valve.

When the heat exchange system is under heating condition, the refrigerant circulation path is compressor→four-way valve→second heat exchanger→throttle device→first heat exchanger→four-way valve→compressor.

When the heat exchange system is under cooling condition, the refrigerant circulation path is compressor→four-way valve→first heat exchanger→throttle device→second heat exchanger→four-way valve→compressor.

In the heating condition, the first valve body and the second valve body are closed or opened according to the refrigerant amount for heat exchange cycle in the heat exchange system, and the refrigerant in the fluid reservoir can enter the heat exchange cycle, or the refrigerant in the heat exchange cycle can enter the fluid reservoir, or keep the refrigerant amount in the fluid reservoir unchanged. Therefore, the on-demand access of the refrigerant to the heat exchange cycle is realized, and the refrigerant amount for the heat exchange cycle is always kept in an appropriate state, to reduce the power of the heat exchange system and improving the energy efficiency of the heat exchange system.

BRIEF DESCRIPTION OF THE DRAWINGS

The embodiments of the present disclosure will become apparent and readily understood from the description of embodiments in conjunction with the following drawings.

Wherein, the corresponding relationship between the reference signs and component names in FIG. 1 is as follows:

100' heat pump unit, 110' compressor, 120' four-way valve, 130' fin type heat exchanger, 140' electronic expansion valve, 150' shell tube type heat exchanger, 200' accumulator.

Figure 2:
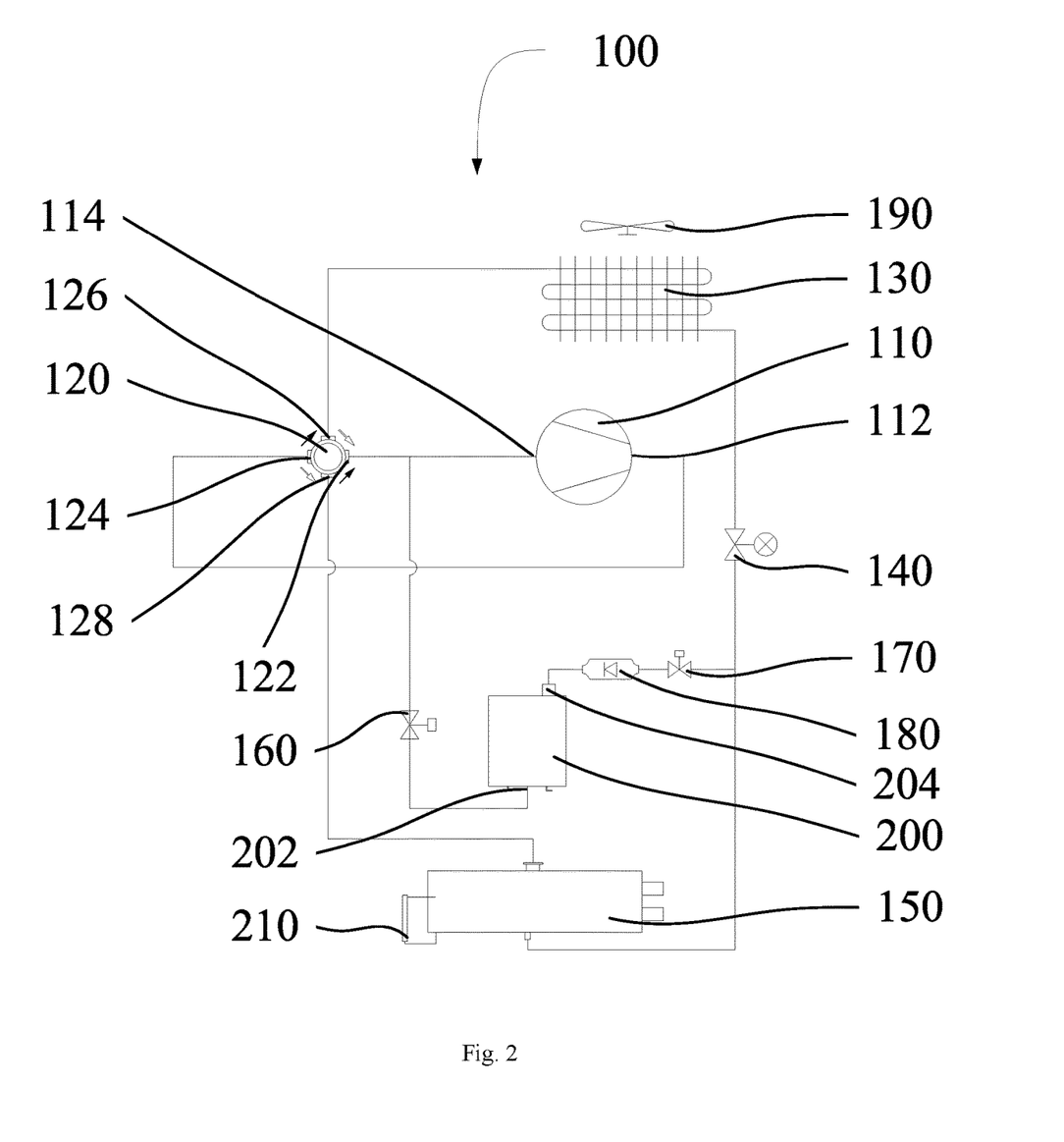
FIG. 2 shows a schematic structural diagram of a heat exchange system provided by an embodiment of the present disclosure.

The corresponding relationship between the reference signs and component names in FIG. 2 is as follows:

100 heat exchange system, 110 compressor, 112 exhaust port, 114 suction port, 120 four-way valve, 122 first end port, 124 second end port, 126 third end port, 128 fourth end port, 130 first heat exchanger, 140 throttle device, 150 second heat exchanger, 160 first valve body, 170 second valve body, 180 one-way valve, 190 fan, 200 fluid reservoir, 202 first communication port, 204 second communication port, 210 detection device.

DETAILED DESCRIPTION OF THE DISCLOSURE

Some embodiments of the present disclosure will be described in further detail with reference to the accompanying drawings and detailed description. It should be noted that the embodiments and features in the embodiments of the present disclosure may be combined with one another without conflicts.

In the following description, numerous specific details are set forth in order to provide a thorough understanding of the present disclosure, but the present disclosure may be practiced otherwise than as described herein, and therefore, the protection scope of the present disclosure is not limited to the exemplary embodiments disclosed below.

A heat exchange system 100, an air conditioning apparatus and a control method for air conditioning apparatus provided according to some embodiments of the present disclosure are described below with reference to FIGS. 2 to 6.

As shown in FIG. 2, according to an embodiment of the present disclosure, the present disclosure provides a heat exchange system 100, including a circulation loop composed of a compressor 110, a four-way valve 120, a first heat exchanger 130, a throttle device 140, and a second heat exchanger 150. Wherein, the first end port 122 of the four-way valve 120 is connected to the suction port 114 of the compressor 110, the second end port 124 of the four-way valve 120 is connected to the exhaust port 112 of the compressor 110. The third end port 126 of the four-way valve 120 is connected to the first heat exchanger 130; the fourth end port 128 of the four-way valve 120 is connected to the second heat exchanger 150. The first heat exchanger 130 and the second heat exchanger 150 are further connected through the throttle device 140.

Furthermore, by changing the communication state of the four-way valve 120, the switching between cooling and heating of the heat exchange system 100 can be realized. For example, as shown in FIG. 2, when the four-way valve 120 works according to the hollow arrow, the heat exchange system 100 is in heating condition. The refrigerant circulation path is compressor 110→four-way valve 120→second heat exchanger 150→throttle device 140→first heat exchanger 130→four-way valve 120→compressor 110; when the four-way valve 120 works according to the solid arrow, the heat exchange system 100 is in cooling condition, the refrigerant circulation path is compressor 110→four-way valve 120→first heat exchanger 130→throttle device 140→second heat exchanger 150→four-way valve 120→compressor 110.

The heat exchange system 100 provided by the present disclosure further includes a fluid reservoir 200, a first valve body 160 and a second valve body 170, and the fluid reservoir 200 comprises a first communication port 202 and a second communication port 204. The first communication port 202 is communicated with the suction port 114 of the compressor 110 through the first valve body 160; the second communication port 204 is communicated with the second heat exchanger 150 through the second valve body 170, and it further comprises a detection device 210 for detecting the refrigerant amount for heat exchange cycle in the heat exchange system 100. In addition, when the heat exchange system 100 operates under heating conditions, the side of second heat exchanger 150 has high-pressure refrigerant. Since the refrigerant on the side of second heat exchanger 150 is in a high-pressure state, if the second valve body 170 is opened and the first valve body 160 is closed, the refrigerant for heat exchange cycle will enter the fluid reservoir 200. If the first valve body 160 and the second valve body 170 are closed, the refrigerant amount in the fluid reservoir 200 and the refrigerant amount for heat exchange cycle remain unchanged. Moreover, the suction port 114 of the compressor 110 is in a low-pressure state, and if the first valve body 160 is opened and the second valve body 170 is closed, the refrigerant in the fluid reservoir 200 will enter the compressor 110 to perform a heat exchange cycle.

Based on the above principle, in heating condition, the first valve body 160 and the second valve body 170 are closed or opened according to the refrigerant amount for heat exchange cycle in the heat exchange system 100, and the refrigerant in the fluid reservoir 200 can enter the heat exchange cycle, or the refrigerant in the heat exchange cycle can enter the fluid reservoir 200, or keep the refrigerant amount in the fluid reservoir 200 unchanged. Therefore, the on-demand access of the refrigerant to the heat exchange cycle is realized, and the refrigerant amount for the heat exchange cycle is always kept in an appropriate state, to reduce the power of the heat exchange system 100 and improving the energy efficiency of the heat exchange system 100.

Furthermore, by setting the first refrigerant amount threshold and the second refrigerant amount threshold, the first refrigerant amount threshold is less than the second refrigerant amount threshold. If the refrigerant amount for the heat exchange cycle in the heat exchange system 100 is less than the first refrigerant amount threshold, it means that the refrigerant amount for the heat exchange cycle in the heat exchange system 100 is insufficient. At this time, the first valve body 160 is opened, and the second valve body 170 is closed, and the refrigerant in the fluid reservoir 200 enters the compressor 110 under the influence of the compressor 110 suction port 114, to increase the refrigerant amount for heat exchange in the heat exchange system 100.

If the refrigerant amount for heat exchange cycle in the heat exchange system 100 is greater than or equal to the first refrigerant amount threshold and less than the second refrigerant amount threshold. It means that the refrigerant amount for heat exchange cycle in the heat exchange system 100 is appropriate. At this time, the first valve body 160 and the second valve body 170 are closed, and the refrigerant for heat exchange cycle in the heat exchange system 100 remains unchanged.

If the refrigerant amount for heat exchange cycle in the heat exchange system 100 is greater than or equal to the second refrigerant amount threshold. It means that the refrigerant amount for heat exchange cycle in the heat exchange system 100 is excessive. At this time, when the first valve body 160 is closed and the second valve body 170 is opened, the refrigerant for heat exchange cycle in the heat exchange system 100 can enter the fluid reservoir 200, to reduce the refrigerant amount for heat exchange in the heat exchange system 100.

As mentioned above, the refrigerant amount for heat exchange cycle in the heat exchange system 100 is dynamically controlled, and the refrigerant amount for heat exchange cycle in the heat exchange system 100 is always in an appropriate state. Therefore, the power of the heat exchange system 100 is reduced, and the energy efficiency of the heat exchange system 100 is improved.

More furthermore, both the first valve body 160 and the second valve body 170 are solenoid valves, and the working states of the first valve body 160 and the second valve body 170 can be controlled by a program.

Wherein, the fluid reservoir 200 may be an accumulator.

It should be noted that the first refrigerant amount threshold and the second refrigerant amount threshold can be set according to actual conditions such as the power of the compressor 110, the total refrigerant amount in the heat exchange system 100, and the heat exchange efficiency of the heat exchanger.

Furthermore, in the heat exchange system 100, a gas-liquid separator and an oil separator are further connected, but both are not relevant to the present disclosure. Therefore, it will not be described here, and can be determine the connection mode of the gas-liquid separator and the oil separator according to related technologies.

For example, the heat exchange system 100 may be a heat pump unit.

In some embodiments, the detection device 210 comprises a liquid level sensor, being arranged at the second heat exchanger 150 for detecting the refrigerant liquid level in the second heat exchanger 150.

In this embodiment, a first liquid level height threshold and a second liquid level height threshold may be set, and the first liquid level height threshold is less than the second liquid level height threshold. If the refrigerant amount for heat exchange in the heat exchange system 100 is insufficient, the liquid level in the second heat exchanger 150 will be lower than the first liquid level height threshold. If the refrigerant amount for heat exchange in the heat exchange system 100 is appropriate, then the liquid level in the second heat exchanger 150 will be greater than or equal to the first liquid level height threshold and less than the second liquid level height threshold. If the refrigerant amount for heat exchange in the heat exchange system 100 is insufficient, the liquid level in the second heat exchanger 150 will be greater than or equal to the second liquid level height threshold. This detection method is simple and effective, and easy to implement.

It is worth noting that the first liquid level height threshold and the second liquid level height threshold can be set according to the actual conditions such as the power of the compressor 110, the total refrigerant amount in the heat exchange system 100 and the heat exchange efficiency of the heat exchanger.

In one embodiment, the detection device 210 comprises a pressure sensor, being arranged at the second heat exchanger 150, for detecting the refrigerant pressure in the second heat exchanger 150.

In this embodiment, a first pressure threshold and a second pressure threshold may be set, and the first pressure threshold is less than the second pressure threshold. If the refrigerant amount for heat exchange in the heat exchange system 100 is insufficient, the pressure in the second heat exchanger 150 will be less than the first pressure threshold. If the refrigerant amount for heat exchange in the heat exchange system 100 is appropriate, then the pressure in the second heat exchanger 150 will be greater than or equal to the first pressure threshold and less than the second pressure threshold. If the refrigerant amount for heat exchange in the heat exchange system 100 is insufficient, the pressure in the second heat exchanger 150 will be greater than or equal to the second pressure threshold. This detection method is simple and effective, and easy to implement.

It is worth noting that the first pressure threshold and the second pressure threshold can be set according to the actual conditions such as the power of the compressor 110, the total refrigerant amount in the heat exchange system 100, and the heat exchange efficiency of the heat exchanger.

As shown in FIG. 2, on the basis of any one of the embodiments, furthermore, the heat exchange system 100 further includes a one-way valve 180. The one-way valve 180 is located on the flow path between the second communication port 204 of the fluid reservoir 200 and the second heat exchanger 150, and the conduction direction of the one-way valve 180 is the direction from the second heat exchanger 150 to the fluid reservoir 200. For example, the one-way valve 180 can be arranged on the flow path between the second communication port 204 of the fluid reservoir 200 and the second valve body 170; the one-way valve 180 can further be arranged on the flow path between the second valve body 170 and the second heat exchanger 150.

In this embodiment, the guided conduction function of the one-way valve 180 is used, and the refrigerant entering the fluid reservoir 200 will not flow back to the side of second heat exchanger 150, to ensure the recovery effect of the refrigerant on the side of second heat exchanger 150 and ensuring the antifreeze protection for the second heat exchanger 150.

As shown in FIG. 2, on the basis of any one of the embodiments, furthermore, the first communication port 202 of the fluid reservoir 200 is communicated to the suction port 114 of the compressor 110 and the first end port 122 of the four-way valve 120 through a three-way pipeline.

In this embodiment, there is no need to set up another pipeline at the suction port 114 of the compressor 110, and it is only necessary to use a three-way pipeline to access the fluid reservoir 200 at an appropriate position. Therefore, it is more conducive to the layout of pipelines, reducing the amount of pipelines and saving costs.

As shown in FIG. 2, on the basis of any one of the embodiments, furthermore, the second communication port 204 of the fluid reservoir 200 is connected with the throttle device 140 and the second heat exchanger 150 through a three-way pipeline.

In this embodiment, there is no need to set up another pipeline at the end port of the second heat exchanger 150, and it is only necessary to use a three-way pipeline to access the fluid reservoir 200 at an appropriate position. Therefore, it is more conducive to the layout of pipelines, reducing the amount of pipelines and saving costs.

As shown in FIG. 2, on the basis of any one of the embodiments, furthermore, the first heat exchanger 130 adopts a fin type heat exchanger.

In the embodiment, the first heat exchanger 130 adopts a fin type heat exchanger, which is more conducive to the thermal circulation when the air flows between the first heat exchangers 130, to facilitate the cooling or heating effect of the heat exchange system 100.

As shown in FIG. 2, on the basis of any one of the embodiments, furthermore, the second heat exchanger 150 adopts a shell tube type heat exchanger.

In this embodiment, the second heat exchanger 150 adopts a shell tube type heat exchanger; For example, it can be a full liquid type shell tube type heat exchanger or a falling film type shell tube type heat exchanger. That is, the high heat transfer coefficient of the shell tube type heat exchanger is used to facilitate the heat exchange of the refrigerant, and the setting of the fluid reservoir 200 can protect the full liquid type shell tube type heat exchanger or the falling film type shell tube type heat exchanger. Thus, the risk of freezing tubes in full liquid type shell tube type heat exchanger or the falling film type shell tube type heat exchanger is avoided.

As shown in FIG. 2, on the basis of any one of the embodiments, furthermore, the heat exchange system 100 further includes a fan 190, being located at the periphery of the second heat exchanger 150, to supply air to the first heat exchanger 130, and the mode of supplying air comprises suction or blowing.

In this embodiment, the fan 190 is used to transmit the cooling or heat generated by the first heat exchanger 130 to the target location, and the purpose of air conditioning.

The first valve body 160 and the second valve body 170 in any of the above embodiments can be normally closed or normally open according to actual needs.

On the basis of any one of the embodiments, the throttle device 140 comprises an electronic expansion valve. The electronic expansion valve is connected between the first heat exchanger 130 and the second heat exchanger 150, and then the heat exchange effect can be adjusted by adjusting the opening of the electronic expansion valve. In addition, after the heat exchange system 100 operates in heating condition and stops, close the electronic expansion valve, and the high-pressure refrigerant can be intercepted on the side of second heat exchanger 150. Therefore, the recovery effect of the fluid reservoir 200 on the refrigerant is improved, and the effect of the antifreeze protection on the second heat exchanger 150 is improved.

The heat exchange system 100 provided by the present disclosure comprises ten main components. That is a shell tube type heat exchanger, an accumulator, a compressor 110, an electronic expansion valve, a fin type heat exchanger, a fan 190, a four-way valve 120, a first solenoid valve, a one-way valve 180, and a second solenoid valve.

When the unit is operating for cooling, the circulation process is compressor 110→four-way valve 120→fin type heat exchanger→electronic expansion valve→shell tube type heat exchanger→four-way valve 120→compressor 110.

When the unit is operating for heating, the circulation process is compressor 110→four-way valve 120→shell tube type heat exchanger→electronic expansion valve→fin type heat exchanger→four-way valve 120→compressor 110.

The inlet of the accumulator is located between the electronic expansion valve and the shell tube type heat exchanger, the heating is operating, and the inlet is under high pressure. The outlet of the accumulator is connected to the suction port 114 of the compressor 110, which is always under low pressure.

During heating operation, if the refrigerant amount in the shell tube is appropriate, close the first solenoid valve and the second solenoid valve. If the refrigerant in the shell tube is insufficient, open the first solenoid valve and close the second solenoid valve to discharge the refrigerant in the accumulator and enter the system circulation. If there is too much refrigerant in the shell tube, close the second solenoid valve, open the second solenoid valve, and discharge the refrigerant in the shell tube type heat exchanger into the accumulator.

During cooling operation, the demand of refrigerant increases, the entire refrigerant needs to be discharged from the accumulator. The actions are as follows: open the first solenoid valve, close the second solenoid valve, discharge the refrigerant in the accumulator, and enter the system circulation.

As shown in FIG. 2, according to an embodiment of the present disclosure, the present disclosure provides a heat exchange system 100, including a circulation loop composed of a compressor 110, a four-way valve 120, a first heat exchanger 130, a throttle device 140, and a second heat exchanger 150. Wherein, the first end port 122 of the four-way valve 120 is connected to the suction port 114 of the compressor 110, the second end port 124 of the four-way valve 120 is connected to the exhaust port 112 of the compressor 110. The third end port 126 of the four-way valve 120 is connected to the first heat exchanger 130; the fourth end port 128 of the four-way valve 120 is connected to the second heat exchanger 150. The first heat exchanger 130 and the second heat exchanger 150 are further connected through the throttle device 140.

Furthermore, by changing the communication state of the four-way valve 120, the switching between cooling and heating of the heat exchange system 100 can be realized. For example, as shown in FIG. 2, when the four-way valve 120 works according to the hollow arrow, the heat exchange system 100 is in heating condition. The refrigerant circulation path is compressor 110→four-way valve 120→second heat exchanger 150→throttle device 140→first heat exchanger 130→four-way valve 120→compressor 110; when the four-way valve 120 works according to the solid arrow, the heat exchange system 100 is in cooling condition, the refrigerant circulation path is compressor 110→four-way valve 120→first heat exchanger 130→throttle device 140→second heat exchanger 150→four-way valve 120→compressor 110.

The heat exchange system 100 provided by the present disclosure further includes a fluid reservoir 200, a first valve body 160 and a second valve body 170, and the fluid reservoir 200 comprises a first communication port 202 and a second communication port 204. The first communication port 202 is communicated with the suction port 114 of the compressor 110 through the first valve body 160; the second communication port 204 is communicated with the second heat exchanger 150 through the second valve body 170. Moreover, after the heat exchange system 100 is operating under heating conditions and stopped, a large amount of high-pressure refrigerant will remain on the side of second heat exchanger 150, and the refrigerant on the side of second heat exchanger 150 is in a high-pressure state. At this time, by opening the second valve body 170 and closing the first valve body 160, the refrigerant on the side of second heat exchanger 150 can be discharged into the fluid reservoir 200, to realize the recovery of the high-pressure refrigerant on the side of second heat exchanger 150. Since the refrigerant amount on the side of second heat exchanger 150 is reduced, the following problems are avoided: that is, due to a large amount of refrigerant remaining on the side of second heat exchanger 150, the refrigerant is cooled on the side of second heat exchanger 150, to cause the freezing tube of the second heat exchanger 150. This provides antifreeze protection for the second heat exchanger 150 and improves the performance of the heat exchange system 100. And after the heat exchange system 100 is restarted, the first heat exchanger 130 can be turned on, and the second heat exchanger 150 can be turned off, because the pressure at the suction port 114 of the compressor 110 is low, the refrigerant stored in the fluid reservoir 200 can be re-inhaled into the compressor 110, and the refrigerant circulation can be continued to ensure the refrigerant amount for heat exchange cycle in the heat exchange system 100.

Furthermore, both the first valve body 160 and the second valve body 170 are solenoid valves, and the working states of the first valve body 160 and the second valve body 170 can be controlled by a program.

In some embodiments, the throttle device 140 comprises an electronic expansion valve. The electronic expansion valve is connected between the first heat exchanger 130 and the second heat exchanger 150, and then the heat exchange effect can be adjusted by adjusting the opening of the electronic expansion valve. In addition, after the heat exchange system 100 operates in heating condition and stops, close the electronic expansion valve, and the high-pressure refrigerant can be intercepted on the side of second heat exchanger 150. Therefore, the recovery effect of the fluid reservoir 200 on the refrigerant is improved, and the effect of the antifreeze protection on the second heat exchanger 150 is improved.

As shown in FIG. 2, on the basis of any embodiments, furthermore, the heat exchange system 100 further includes a one-way valve 180. The one-way valve 180 is located on the flow path between the second communication port 204 of the fluid reservoir 200 and the second heat exchanger 150, and the conduction direction of the one-way valve 180 is the direction from the second heat exchanger 150 to the fluid reservoir 200. For example, the one-way valve 180 can be arranged on the flow path between the second communication port 204 of the fluid reservoir 200 and the second valve body 170; the one-way valve 180 can further be arranged on the flow path between the second valve body 170 and the second heat exchanger 150.

In this embodiment, the guided conduction function of the one-way valve 180 is used, and the refrigerant entering the fluid reservoir 200 will not flow back to the side of second heat exchanger 150, to ensure the recovery effect of the refrigerant on the side of second heat exchanger 150 and ensuring the antifreeze protection for the second heat exchanger 150.

As shown in FIG. 2, on the basis of any embodiments, the first communication port 202 of the fluid reservoir 200 is communicated to the suction port 114 of the compressor 110 and the first end port 122 of the four-way valve 120 through a three-way pipeline.

In this embodiment, there is no need to set up another pipeline at the suction port 114 of the compressor 110, and it is only necessary to use a three-way pipeline to access the fluid reservoir 200 at an appropriate position. Therefore, it is more conducive to the layout of pipelines, reducing the amount of pipelines and saving costs.

As shown in FIG. 2, on the basis of any embodiments, furthermore, the second communication port 204 of the fluid reservoir 200 is connected with the throttle device 140 and the second heat exchanger 150 through a three-way pipeline.

In this embodiment, there is no need to set up another pipeline at the end port of the second heat exchanger 150, and it is only necessary to use a three-way pipeline to access the fluid reservoir 200 at an appropriate position. Therefore, it is more conducive to the layout of pipelines, reducing the amount of pipelines and saving costs.

As shown in FIG. 2, on the basis of any embodiments, furthermore, the first heat exchanger 130 adopts a fin type heat exchanger.

In the embodiment, the first heat exchanger 130 adopts a fin type heat exchanger, which is more conducive to the thermal circulation when the air flows between the first heat exchangers 130, to facilitate the cooling or heating effect of the heat exchange system 100.

As shown in FIG. 2, on the basis of any embodiments, furthermore, the second heat exchanger 150 adopts a shell tube type heat exchanger.

In this embodiment, the second heat exchanger 150 adopts a shell tube type heat exchanger; For example, it can be a full liquid type shell tube type heat exchanger or a falling film type shell tube type heat exchanger. That is, the high heat transfer coefficient of the shell tube type heat exchanger is used to facilitate the heat exchange of the refrigerant, and the setting of the fluid reservoir 200 can protect the full liquid type shell tube type heat exchanger or the falling film type shell tube type heat exchanger. Thus, the risk of freezing tubes in full liquid type shell tube type heat exchanger or the falling film type shell tube type heat exchanger is avoided.

As shown in FIG. 2, on the basis of any embodiments, furthermore, the heat exchange system 100 further includes a fan 190, being located at the periphery of the second heat exchanger 150, to supply air to the first heat exchanger 130, and the mode of supplying air comprises suction or blowing.

In this embodiment, the fan 190 is used to transmit the cooling or heat generated by the first heat exchanger 130 to the target location, and the purpose of air conditioning.

The first valve body 160 and the second valve body 170 in any of the above embodiments can be normally closed or normally open according to actual needs.

The heat exchange system 100 provided by the present disclosure comprises ten main components. That is a shell tube type heat exchanger, an accumulator 200, a compressor 110, an electronic expansion valve, a fin type heat exchanger, a fan 190, a four-way valve 120, a first solenoid valve, a one-way valve 180, and a second solenoid valve.

When the system is operating for cooling, the circulation process is compressor 110→four-way valve 120→fin type heat exchanger→electronic expansion valve→shell tube type heat exchanger→four-way valve 120→compressor 110.

When the system is operating for heating, the circulation process is compressor 110→four-way valve 120→shell tube type heat exchanger→electronic expansion valve→fin type heat exchanger→four-way valve 120→compressor 110.

The inlet of the accumulator 200 is located between the electronic expansion valve and the shell tube type heat exchanger, the heating is operating, and the inlet is under high pressure. The outlet of the accumulator 200 is connected to the suction port 114 of the compressor 110, which is always under low pressure.

Heating mode shutdown: after the compressor 110 stops, the electronic expansion valve is closed, the first solenoid valve is closed, the second solenoid valve is opened, and the refrigerant in the shell tube type heat exchanger flows through the second solenoid valve and the one-way valve 180, and is discharged into the fluid reservoir 200, and through the one-way valve 180 to prevent the refrigerant from flowing back to the shell tube type heat exchanger.

Wherein, the fluid reservoir may be an accumulator.

Furthermore, in the heat exchange system 100, a gas-liquid separator and an oil separator are further connected, but both are not relevant to the present disclosure. Therefore, it will not be described here, and can determine the connection mode of the gas-liquid separator and the oil separator according to related technologies.

For example, the heat exchange system 100 may be a heat pump unit.

Furthermore, it further comprises a detection device 210, being located at the second heat exchanger 150, for detecting the refrigerant amount in the heat exchange system 100, and to increase or decrease the refrigerant according to the actual situation to improve the energy efficiency of the heat exchange system 100.

According to an embodiment of the present disclosure, the present disclosure provides an air conditioning apparatus, including the heat exchange system 100 as provided in any one of the above-mentioned embodiments.

The air conditioning apparatus provided by the present disclosure comprises the heat exchange system 100 provided in any one of the above-mentioned embodiments. Therefore, it has all the beneficial effects of the heat exchange system 100 as provided in any one of the above-mentioned embodiments, which are not repeated here one by one.

Figure 3:
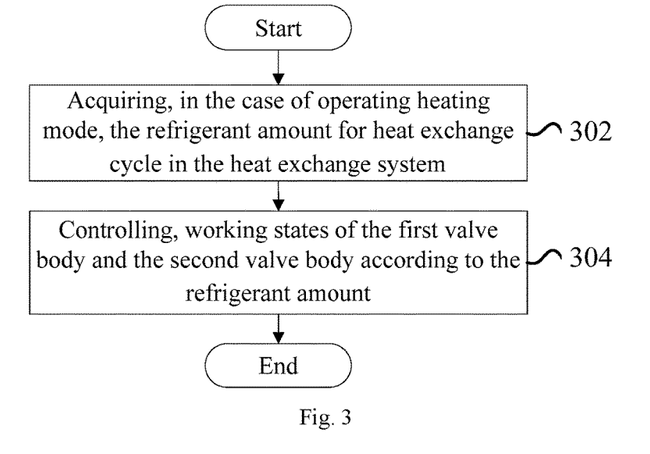
FIG. 3 shows a flow chart of a control method for air conditioning apparatus provided by embodiments of the present disclosure.

FIG. 3 shows a flow chart of a control method for air conditioning apparatus provided by one embodiment of the present disclosure.

As shown in FIG. 3, the specific process of the control method for air conditioning apparatus provided by an embodiment of the present disclosure is as follows:

Step 302: acquiring, in the case of operating heating mode, the refrigerant amount for heat exchange cycle in the heat exchange system;

Step 304: controlling, the working state of the first valve body and the second valve body according to the refrigerant amount.

The control method for air conditioning apparatus provided by the present disclosure, based on the air conditioning apparatus provided by any one of the above-mentioned embodiments, that is, when the four-way valve works according to the hollow arrow, when the air conditioning apparatus operates in heating mode, the refrigerant circulation path is, compressor→four-way valve→second heat exchanger→throttle device→first heat exchanger→four-way valve→compressor; when the four-way valve works according to the solid arrow, when the air conditioning apparatus operates in cooling mode, the refrigerant circulation path is, compressor→four-way valve→first heat exchanger→throttle device→second heat exchanger→four-way valve→compressor.

When the heat exchange system 100 operates under heating conditions, the side of second heat exchanger 150 has high-pressure refrigerant. Since the refrigerant on the side of second heat exchanger 150 is in a high-pressure state, if the second valve body 170 is opened and the first valve body 160 is closed, the refrigerant for heat exchange cycle will enter the fluid reservoir. If the first valve body and the second valve body are closed, the refrigerant amount in the fluid reservoir and the refrigerant amount for heat exchange cycle remain unchanged. Moreover, the suction port of the compressor is in a low-pressure state, and if the first valve body is opened and the second valve body is closed, the refrigerant in the fluid reservoir will enter the compressor to perform a heat exchange cycle.

Based on the above principle, in heating condition, the first valve body and the second valve body are closed or opened according to the refrigerant amount for heat exchange cycle in the heat exchange system, and the refrigerant in the fluid reservoir can enter the heat exchange cycle, or the refrigerant in the heat exchange cycle can enter the fluid reservoir, or keep the refrigerant amount in the fluid reservoir unchanged. Therefore, the on-demand access of the refrigerant to the heat exchange cycle is realized, and the refrigerant amount for the heat exchange cycle is always kept in an appropriate state, to reduce the power of the heat exchange system and improving the energy efficiency of the heat exchange system.

Figure 4:
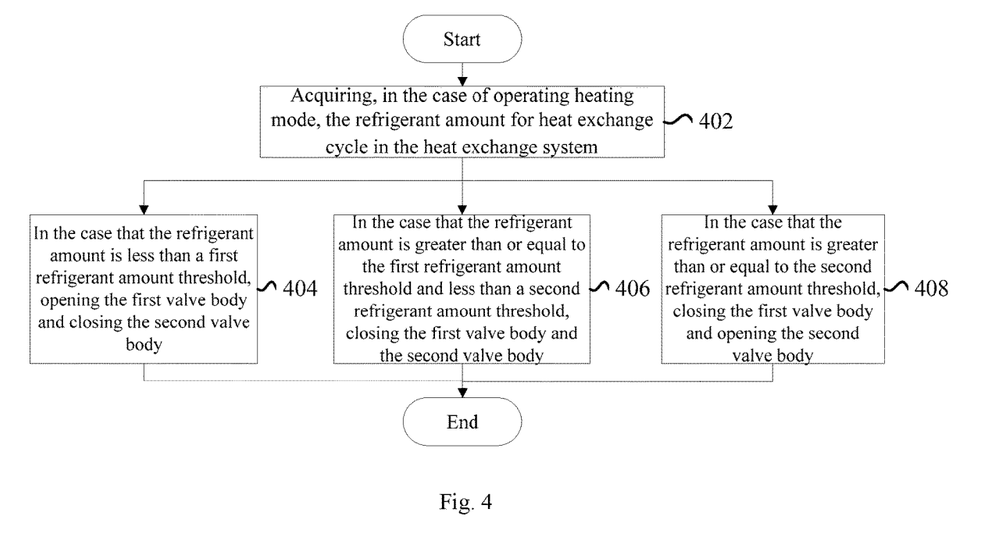
FIG. 4 shows a flow chart of a control method for air conditioning apparatus provided by embodiments of the present disclosure.

FIG. 4 shows a flow chart of a control method for air conditioning apparatus provided by some embodiments of the present disclosure.

As shown in FIG. 4, the specific process of the control method for air conditioning apparatus provided by an embodiment of the present disclosure is as follows:

Step 402: acquiring, in the case of operating heating mode, the refrigerant amount for heat exchange cycle in the heat exchange system;

Step 404: in the case that the refrigerant amount is less than a first refrigerant amount threshold, opening the first valve body and closing the second valve body;

Step 406: in the case that the refrigerant amount is greater than or equal to the first refrigerant amount threshold and less than a second refrigerant amount threshold, closing the first valve body and the second valve body;

Step 408: in the case that the refrigerant amount is greater than or equal to the second refrigerant amount threshold, closing the first valve body and opening the second valve body.

The control method for air conditioning apparatus provided by embodiments of the present disclosure, by setting the first refrigerant amount threshold and the second refrigerant amount threshold, the first refrigerant amount threshold is less than the second refrigerant amount threshold. If the refrigerant amount for the heat exchange cycle in the heat exchange system is less than the first refrigerant amount threshold, it means that the refrigerant amount for the heat exchange cycle in the heat exchange system is insufficient. At this time, the first valve body is opened, and the second valve body is closed, and the refrigerant in the fluid reservoir enters the compressor under the influence of the compressor suction port, to increase the refrigerant amount for heat exchange in the heat exchange system.

If the refrigerant amount for heat exchange cycle in the heat exchange system is greater than or equal to the first refrigerant amount threshold and less than the second refrigerant amount threshold. It means that the refrigerant amount for heat exchange cycle in the heat exchange system is appropriate. At this time, the first valve body and the second valve body are closed, and the refrigerant for heat exchange cycle in the heat exchange system remains unchanged.

If the refrigerant amount for heat exchange cycle in the heat exchange system is greater than or equal to the second refrigerant amount threshold. It means that the refrigerant amount for heat exchange cycle in the heat exchange system is excessive. At this time, when the first valve body is closed and the second valve body is opened, the refrigerant for heat exchange cycle in the heat exchange system can enter the fluid reservoir, to reduce the refrigerant amount for heat exchange in the heat exchange system.

As mentioned above, the refrigerant amount for heat exchange cycle in the heat exchange system is dynamically controlled, and the refrigerant amount for heat exchange cycle in the heat exchange system is always in an appropriate state. Therefore, the power of the heat exchange system is reduced, and the energy efficiency of the heat exchange system is improved.

It should be noted that the first refrigerant amount threshold and the second refrigerant amount threshold can be set according to actual conditions such as the power of the compressor, the total refrigerant amount in the heat exchange system, and the heat exchange efficiency of the heat exchanger.

In some embodiments, in the case of operating the cooling mode, opening the first valve body and closing the second valve body.

In this embodiment, when the air conditioning apparatus operates in cooling mode, the first valve body is opened and the second valve body is closed. Therefore, the refrigerant in the fluid reservoir enters the compressor and enters the heat exchange cycle of the heat exchange system, to meet the cooling demand of the air conditioning apparatus, to reduce the power and improving the energy efficiency.

The connection in the present disclosure comprises connecting via pipeline; the communication comprises communicating via pipeline.

Figure 5:
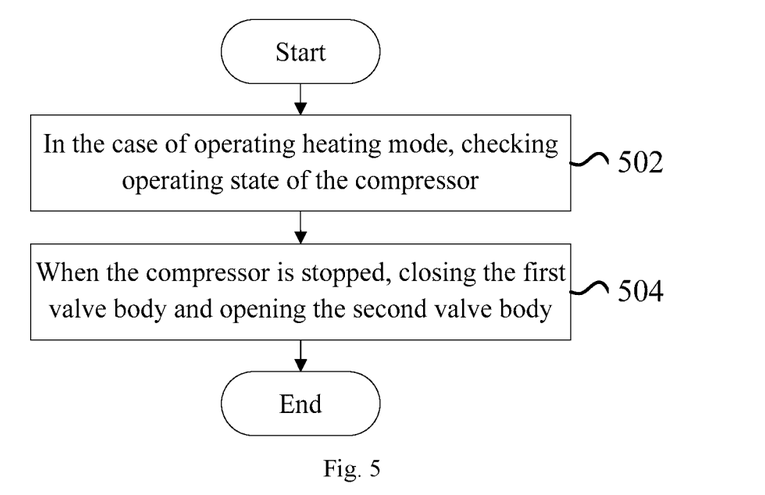
FIG. 5 shows a partial flow chart of a control method for air conditioning apparatus provided by embodiments of the present disclosure.

FIG. 5 shows a partial flow chart of a control method for air conditioning apparatus provided by some embodiments of the present disclosure.

As shown in FIG. 5, a part of the specific process of the control method for air conditioning apparatus provided by the embodiment of the present disclosure is as follows:

Step 502: in the case of operating heating mode, checking operating state of the compressor;

Step 504: when the compressor is stopped, closing the first valve body and opening the second valve body.

In some embodiments, the present disclosure provides a control method for air conditioning apparatus, based on the air conditioning apparatus provided in any one of the above-mentioned embodiments, that is, when the four-way valve works according to the hollow arrow, when the air conditioning apparatus operates in heating mode, the refrigerant circulation path is, compressor→four-way valve→second heat exchanger→throttle device→first heat exchanger→four-way valve→compressor; When the four-way valve works according to the solid arrow, when the air conditioning apparatus operates in cooling mode, the refrigerant circulation path is, compressor→four-way valve→first heat exchanger→throttle device→second heat exchanger→four-way valve→compressor.

Furthermore, the recovery of the refrigerant on the side of second heat exchanger is realized by using the fluid reservoir, the first valve body and the second valve body. Moreover, after the air conditioning apparatus is operating under heating conditions and stopped, a large amount of high-pressure refrigerant will remain on the side of second heat exchanger, and the refrigerant on the side of second heat exchanger is in a high-pressure state. At this time, by opening the second valve body and closing the first valve body, the refrigerant on the side of second heat exchanger can be discharged into the fluid reservoir, to realize the recovery of the high-pressure refrigerant on the side of second heat exchanger. Since the refrigerant amount on the side of second heat exchanger is reduced, the following problems are avoided: that is, due to a large amount of refrigerant remaining on the side of second heat exchanger, the refrigerant is cooled on the side of second heat exchanger, to cause the freezing tube of the second heat exchanger. This provides antifreeze protection for the second heat exchanger and improves the performance of the heat exchange system. And after the heat exchange system is restarted, the first heat exchanger can be turned on, and the second heat exchanger can be turned off, because the pressure at the suction port of the compressor is low, the refrigerant stored in the fluid reservoir can be re-inhaled into the compressor, and the refrigerant circulation can be continued to ensure the refrigerant amount for heat exchange cycle in the heat exchange system.

For example, in the heating mode, the refrigerant is in a high-pressure state on the side of second heat exchanger. At this time, the pressure at the connection between one side of the second valve body and the second heat exchanger is greater than the pressure in the fluid reservoir. Then, after opening the second valve body, the refrigerant will flow into the fluid reservoir under the action of pressure, and the purpose of discharging the refrigerant in the second heat exchanger. Thereby avoiding the accumulation of refrigerant in the second heat exchanger after shutdown, and causing the cooling of the side of second heat exchanger after evaporating and absorbing heat, avoiding the risk of freezing tubes.

Figure 6:
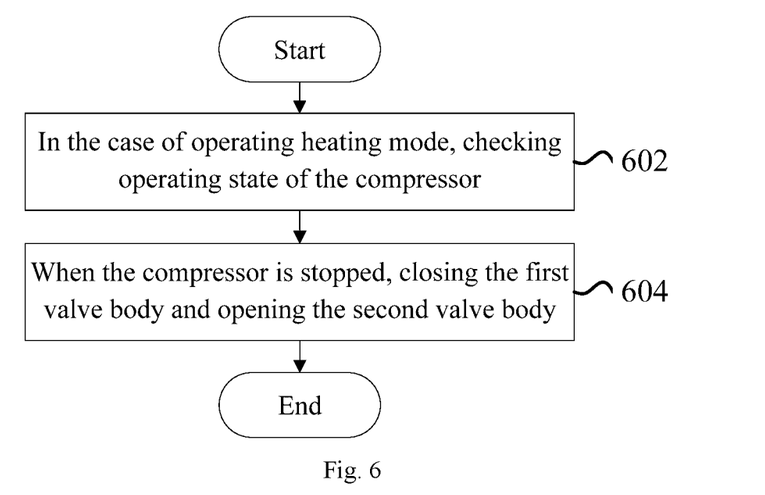
FIG. 6 shows a partial flow chart of a control method for air conditioning apparatus provided by embodiments of the present disclosure.

FIG. 6 shows a partial flow chart of a control method for air conditioning apparatus provided by embodiments of the present disclosure.

As shown in FIG. 6, a part of the specific process of the control method for air conditioning apparatus provided by the embodiment of the present disclosure is as follows:

Step 602: in the case of operating heating mode, checking operating state of the compressor;

Step 604: when the compressor is stopped, closing the first valve body and opening the second valve body.

The present disclosure provides a control method for air conditioning apparatus, on the basis of some embodiments, furthermore, when the throttle device comprises an electronic expansion valve, after the air conditioning apparatus operates in heating mode and stops, closing the first valve body and the electronic expansion valve, open the second valve body. Therefore, the high-pressure refrigerant can be intercepted on the side of second heat exchanger to improve the recovery effect of the fluid reservoir on the refrigerant and the effect of antifreeze protection on the second heat exchanger.

In some embodiments, based on the condition of operating the hot and cold mode, the operating state of the compressor is detected; when the compressor stops operating, the first valve body and the second valve body are closed.

In this embodiment, when the air conditioning apparatus operates in cooling mode, when the compressor is stopped, the first valve body and the second valve body are closed, and there is a sufficient circulating refrigerant amount when it is convenient to turn on the air conditioning apparatus again after the cooling mode.

The connection in the present disclosure comprises connecting via pipeline; the communication comprises communicating via pipeline.

In the present disclosure, the terms "installing", "connected", "connection", "fixing" and the like should be understood in a broad sense. For example, "connection" may be a fixed connection, a removable connection or an integral connection; and "connected" may refer to direct connection or indirect connection through an intermediary. Understanding of the specific meaning of the terms in the present disclosure according to specific situations.

In the description of the present specification, the descriptions of the terms "one embodiment", "some embodiments" and "exemplary embodiments" and the like mean that specific features, structures, materials or characteristics described in conjunction with the embodiment(s) or example (s) are comprised in at least one embodiment or example of the present disclosure. In the specification, the schematic representation of the above terms does not necessarily refer to the same embodiment or example. Moreover, the specific features, structures, materials or characteristics described may be combined in an adapted manner in any one or more embodiments or examples.

What is claimed is:

1. A heat exchange system comprising:
a compressor, comprising an exhaust port and a suction port;
a four-way valve, wherein a first end port of the four-way valve is communicated with the suction port, and a second end port of the four-way valve is communicated with the exhaust port;
an outdoor heat exchanger, wherein one end of the outdoor heat exchanger is communicated with a third end port of the four-way valve;
a throttle device, wherein one end of the throttle device is communicated with another end of the outdoor heat exchanger;
an indoor heat exchanger, wherein one end of the indoor heat exchanger is communicated with another end of the throttle device, and another end of the indoor heat exchanger is communicated with a fourth end port of the four-way valve;
a fluid reservoir, comprising a first communication port and a second communication port, wherein the first communication port is communicated with the suction port, and the second communication port is communicated with one end of the indoor heat exchanger;
a first valve body, being arranged on a flow path between the fluid reservoir and the compressor;
a second valve body, being arranged on a flow path between the second communication port of the fluid reservoir and the throttle device; and
a detection device arranged at the indoor heat exchanger and communicating with refrigerant in the indoor heat exchanger, and configured to detect an amount of refrigerant for heat exchange cycle in the heat exchange system;
wherein when the heat exchange system operates in a heating condition, working states of the first valve body and the second valve body are controlled according to the amount of refrigerant in the heat exchange system.

2. The heat exchange system according to claim 1, wherein
the detection device comprises a pressure sensor.

3. The heat exchange system according to claim 1, further comprising:
a one-way valve, being arranged at a flow path between the second communication port of the fluid reservoir and the indoor heat exchanger, and the one-way valve is conducted in a direction from the indoor heat exchanger to the fluid reservoir.

4. The heat exchange system according to claim 1, wherein
the first communication port of the fluid reservoir is connected at a flow path between the suction port and the first end port of the four-way valve; and/or
the second communication port of the fluid reservoir is connected at a flow path between the throttle device and the indoor heat exchanger.

5. The heat exchange system according to claim 1, wherein
the first heat exchanger is a fin heat exchanger; and/or
the indoor heat exchanger is a shell tube heat exchanger.

6. The heat exchange system according to claim 1, wherein the heat exchange system further comprises:
a fan, for supplying air to the outdoor heat exchanger.

7. The heat exchange system according to claim 1, wherein
the first valve body is configured to be closed and the second valve body is configured to be opened after the heat exchange system is operated in heating condition and stopped.

8. The heat exchange system according to claim 1, wherein
the throttle device comprises an electronic expansion valve, and the electronic expansion valve is configured to be closed after the heat exchange system is operated in heating condition and stopped.

9. An air conditioning apparatus, comprising:
a heat exchange system comprising:
a compressor, comprising an exhaust port and a suction port;
a four-way valve, wherein a first end port of the four-way valve is communicated with the suction port, and a second end port of the four-way valve is communicated with the exhaust port;
an outdoor heat exchanger, wherein one end of the outdoor heat exchanger is communicated with a third end port of the four-way valve;
a throttle device, wherein one end of the throttle device is communicated with another end of the outdoor heat exchanger;
an indoor heat exchanger, wherein one end of the indoor heat exchanger is communicated with another end of the throttle device, and another end of the indoor heat exchanger is communicated with a fourth end port of the four-way valve;
a fluid reservoir, comprising a first communication port and a second communication port, wherein the first communication port is communicated with the suction port, and the second communication port is communicated with one end of the indoor heat exchanger;
a first valve body, being arranged on a flow path between the fluid reservoir and the compressor;
a second valve body, being arranged on a flow path between the second communication port of the fluid reservoir and the throttle device; and
a detection device arranged at the indoor heat exchanger and communicating with refrigerant in the indoor heat exchanger, and configured to detect an amount of refrigerant for heat exchange cycle in the heat exchange system,
wherein when the heat exchange system operates in a heating condition, working states of the first valve body and the second valve body are controlled according to the amount of refrigerant in the heat exchange system.

10. A control method configured for the air conditioning apparatus according to claim 9, comprising:
acquiring, if operating heating mode, an amount of refrigerant for heat exchange cycle in the heat exchange system; and
controlling working states of the first valve body and the second valve body according to the amount of refrigerant.

11. The control method according to claim 10, wherein the controlling working states of the first valve body and the second valve body according to the refrigerant amount comprises:
if the amount of refrigerant is less than a first refrigerant amount threshold, opening the first valve body and closing the second valve body;
if the amount of refrigerant is greater than or equal to the first refrigerant amount threshold and less than a second refrigerant amount threshold, closing the first valve body and the second valve body; and
if the refrigerant amount is greater than or equal to the second refrigerant amount threshold, closing the first valve body and opening the second valve body,
the first refrigerant amount threshold is less than the second refrigerant amount threshold.

12. The control method according to claim 10, wherein
if operating a cooling mode, opening the first valve body and closing the second valve body.

13. The control method according to claim 10, further comprising:
if operating a heating mode, checking an operating state of the compressor; and
if the compressor is stopped, closing the first valve body and opening the second valve body.

14. The control method according to claim 13, wherein
if the throttle device comprises an electronic expansion valve, the step after the compressor is stopped, further comprises:
closing, the electronic expansion valve.

15. The control method according to claim 13, wherein
if operating a cooling mode, checking the operating state of the compressor,
if the compressor stopping operating, closing the first valve body and the second valve body.

* * * * *